United States Patent
Desai et al.

(10) Patent No.: US 9,781,349 B2
(45) Date of Patent: Oct. 3, 2017

(54) DYNAMIC FIELD OF VIEW ADJUSTMENT FOR PANORAMIC VIDEO CONTENT

(71) Applicant: 360fly, Inc., Fort Lauderdale, FL (US)

(72) Inventors: Pratik Desai, Boca Raton, FL (US); Sybren Daniel Smith, Plantation, FL (US); Moises De La Cruz, Cooper City, FL (US); John Nicholas Shemelynce, Fort Lauderdale, FL (US)

(73) Assignee: 360fly, Inc., Fort Lauderdale, FL (US)

( * ) Notice: Subject to any disclaimer, the term of this patent is extended or adjusted under 35 U.S.C. 154(b) by 0 days.

(21) Appl. No.: 14/988,297

(22) Filed: Jan. 5, 2016

(65) Prior Publication Data

US 2017/0195576 A1    Jul. 6, 2017

(51) Int. Cl.
*H04N 7/00*    (2011.01)
*H04N 7/14*    (2006.01)
*H04N 5/232*    (2006.01)
*H04R 1/32*    (2006.01)

(52) U.S. Cl.
CPC ..... *H04N 5/23296* (2013.01); *H04N 5/23238* (2013.01); *H04R 1/326* (2013.01)

(58) Field of Classification Search
CPC ................. H04N 5/23296; H04N 5/23238
See application file for complete search history.

(56) References Cited

U.S. PATENT DOCUMENTS

| | | | |
|---|---|---|---|
| 6,999,923 B1 | 2/2006 | Ablondi et al. | |
| 8,730,322 B2 | 5/2014 | Rondinelli et al. | |
| 2007/0019066 A1* | 1/2007 | Cutler | H04N 5/23238 348/14.08 |
| 2008/0198159 A1* | 8/2008 | Liu | G08B 13/19641 345/420 |
| 2009/0122198 A1* | 5/2009 | Thorn | G06K 9/00221 348/715 |
| 2013/0121527 A1 | 5/2013 | Chambers et al. | |
| 2015/0234156 A1 | 8/2015 | Rondinelli et al. | |
| 2015/0256746 A1 | 9/2015 | MacMillan et al. | |
| 2015/0347823 A1* | 12/2015 | Monnerat | G06K 9/00288 382/118 |
| 2016/0050368 A1* | 2/2016 | Seo | H04N 5/23238 348/36 |
| 2016/0140396 A1* | 5/2016 | Feng | G06K 9/00718 348/14.08 |

OTHER PUBLICATIONS

Russian Federal Service for Intellectual Property (Rospatent), International Search Report and Written Opinion dated Jun. 1, 2017 as issued in connection with counterpart International Application No. PCT/US2017/012294 (9 pages).

* cited by examiner

*Primary Examiner* — Tsion B Owens
(74) *Attorney, Agent, or Firm* — Daniel C. Crilly; Mansour Ghomeshi

(57) ABSTRACT

The invention relates to capturing, processing, and displaying panoramic content such as video content and image data with a panoramic camera system. In one embodiment, a method for processing panoramic video content may include capturing video content in a data storage medium of a panoramic camera; dividing the captured video content into multiple analysis portions; detecting sound associated with at least one of the analysis portions; identifying content of interest from which at least one sound has been detected; and, automatically panning a field of view for the captured video content in response to the identified content of interest.

3 Claims, 8 Drawing Sheets

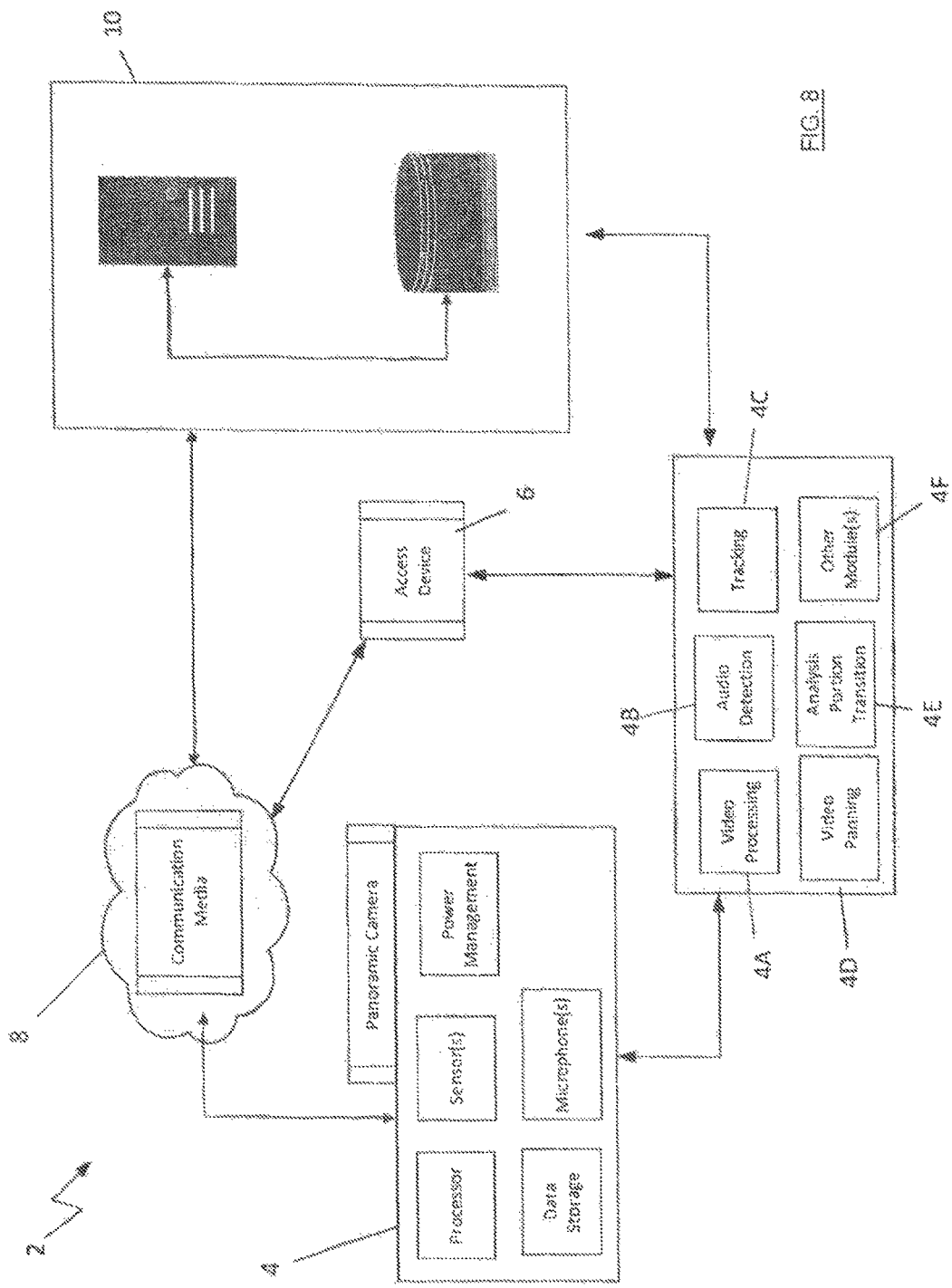

DYNAMIC FIELD OF VIEW ADJUSTMENT FOR PANORAMIC VIDEO CONTENT

FIELD OF THE INVENTION

The present invention generally relates to panoramic camera systems and processing content derived from panoramic cameras. In certain embodiments, the invention relates to capturing, processing, and displaying panoramic content such as video content and image data derived from a panoramic camera.

BACKGROUND INFORMATION

For a human user to experience a comfortable view of a 360° video, only a portion of the video is usually rendered during playback on a two-dimensional surface (e.g., a smart phone display, computer monitor, mobile device screen, etc.) Typically, the user needs to manually pan the video to view portions of the video containing objects or content of interest. However, a problem arises if the user is not aware of the location of the content of interest within the video. The user may miss an important scene, event, object, or other content of interest due to the inherent limitations of manually panning the video content. This problem is further exacerbated during live streaming of the video content, such as during a musical concert, live broadcast, video conference, or other live events, in view of human limitations associated with manually tracking content of interest in real-time.

What are needed therefore are enhanced techniques, tools, and solutions which employ dynamic adjustment of field of view for video content to promote retaining content of interest in the playback field of view.

SUMMARY OF THE INVENTION

An aspect of the present invention is to provide a method for processing panoramic video content. In one embodiment, a method for processing panoramic video content may include capturing video content in a data storage medium of a panoramic camera; dividing the captured video content into multiple analysis portions; detecting sound associated with at least one of the analysis portions; identifying content of interest from which at least one sound has been detected; and, automatically panning a field of view for the captured video content in response to the identified content of interest.

In another embodiment, a method for processing panoramic video content is provided. The method comprises determining at least one of a direction, orientation, or position of a panoramic camera; capturing video content in a data storage medium of the panoramic camera; and, automatically directing the field of view for the captured video content in alignment with the determined direction, orientation, or position of the camera.

In another embodiment, a method for processing panoramic video is provided. The method comprises receiving, in a data storage medium of the panoramic camera, location information associated with an object from a remote tracking device; capturing video content in the data storage medium of the panoramic camera; and adjusting a field of view of the captured video content in response to the location information associated with the remote tracking device.

A further aspect of the invention is to provide system and computer-readable media embodiments which process panoramic video content in accordance with various embodiments of the invention described herein.

These and other aspects of the present invention will be more apparent from the following description.

BRIEF DESCRIPTION OF THE DRAWINGS

FIG. 8 includes a schematic representation of one example of a panoramic camera system which can be provided in accordance with certain embodiments of the invention;

DETAILED DESCRIPTION

Figure 1:
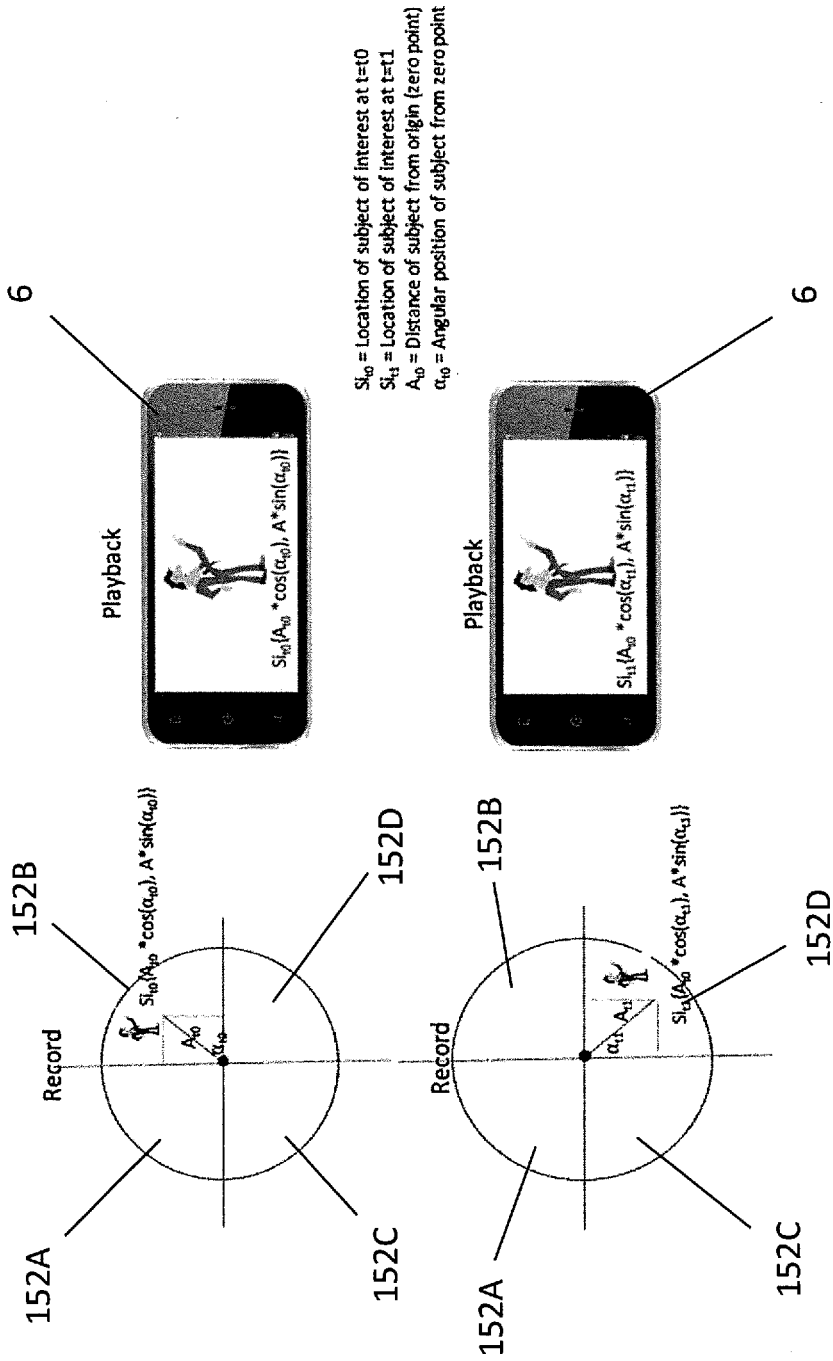
FIG. 1 schematically illustrates an example of calculating location information for content of interest.

In various embodiments, the invention provides panoramic cameras, panoramic camera systems, and other devices programmed for capturing, processing, and displaying content derived from generating panoramic video content. Enhanced techniques, tools, and solutions are provided which employ dynamic adjustment of field of view for video content by tracking the location of content of interest in the video and automatically panning the video field of view during live streaming or playback to promote retaining the identified content of interest in the field of view. In certain embodiments, microphones, directional microphones, or other audio sensors may be employed to identify an analysis area or region around the panoramic camera where content of interest is likely to be discovered.

In one example shown schematically in FIG. 8, a panoramic camera system 2 may include a camera 4 combined with one or more additional devices 6 to store data, to run computations, to view videos, to provide user interfaces, to communicate data through communication media 8 or networks, to communicate with various computer systems 10, and/or to organize the communication between or among different components of the system, among other tasks or functions. For example, the panoramic camera 4 may be operatively associated with various modules 4A-4F programmed to execute computer-implemented instructions for processing and analyzing panoramic content. The tasks and functions described herein can be combined in single devices like smart phones, mobile devices, computing devices or other access devices 6, for example, or they can be integrated with more complex systems such as web servers 10. The modules 4A-4F may be embodied as software, hardware, or other components capable of processing computer-implemented instructions for performing various tasks, such as the functions of the modules 4A-4F described herein. Video content can be a recorded or stored video content or a live video stream captured during use of the camera 4.

The architecture of the panoramic camera system 2 can be modified to meet different requirements. For example, it might be useful to concentrate operative components of the modules 4A-4F directly on the camera device 4 to reduce the amount of data that has to be transferred after video content has been captured. For other applications, it may be more desirable to integrate one or more of the modules on servers 10 or other computer systems to which the video content can be uploaded and processed. It can be appreciated that different panoramic camera systems may employ one or a combination of a panoramic camera, an access device, a computer system, or other suitable components.

In certain embodiments, movement of certain content of interest can be continuously monitored and tracked within video content both during playback of recorded content and during live video steaming. Content of interest may include people, articles, or other objects of interest which may appear in the video content. In one embodiment, polar coordinates of the content of interest relative to a zero point reference (e.g., see FIG. 1) may be calculated as location information for the content of interest, for example. The calculated location information may be associated with or embedded into the metadata of each frame of the video content, for example, and the location information can then be used during playback of the video to automatically pan the video playback field of view to keep the content of interest within the playback field of view. For live streaming applications of the panoramic camera 4, the location information can likewise be used to automatically pan the field of view for the camera to promote keeping a user's field of view focused on the content of interest.

Figure 2:
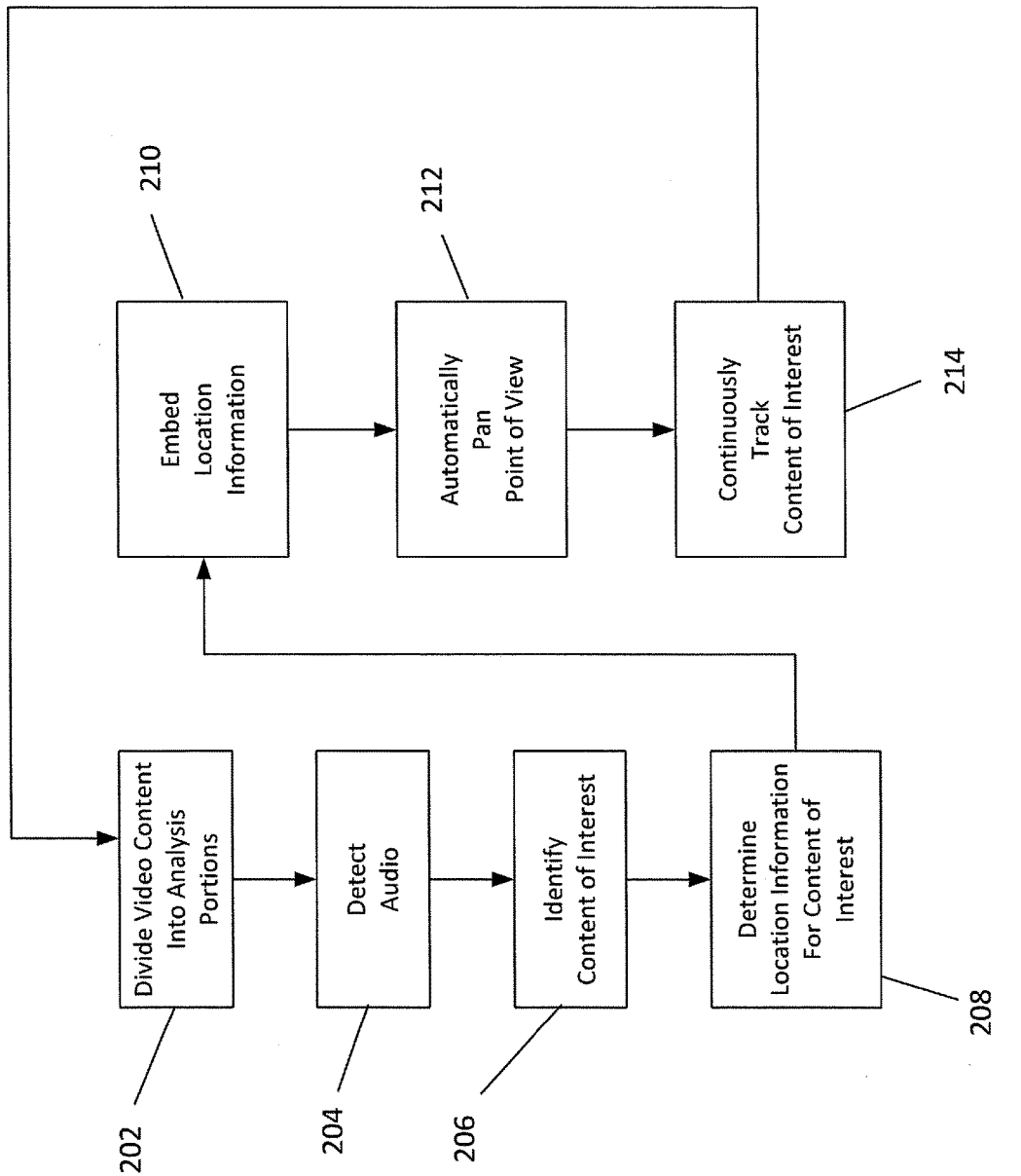
FIG. 2 includes a process flow diagram illustrating an example of processing and execution of tasks by various modules in accordance with various embodiments of the invention.

With reference to FIGS. 1 and 2, a video processing module 4A may be programmed, for each given video frame being recorded, to divide the video content into multiple analysis portions (e.g., quadrants 152A-152D as shown in FIG. 1) at step 202. At step 204, an audio detection module 4B may be configured to work in association with one or more microphones or other audio sensors of the camera 4 to receive and process audio data associated with the video content. In response to detecting audio (e.g., person speaking, music playing, defined noise or audio signature, etc.) in a given analysis portion 152A-152D, at step 206 a content of interest tracking module 4C may be programmed to identify the content of interest within the analysis portion 152A-152D associated with the detected audio. The audio detection module 4B may identify a signature for the detected noise or sound to determine whether the sound is a voice, music, animal noise, or other types of sounds. The module 4B may analyze different attributes of the sound, such as amplitude, frequency, voice pattern, pitch, or other characteristics in an effort to identify the type of sound that has been detected or to distinguish the type of sound from other types of sounds (e.g., human voices versus birds chirping). In one example, the camera 4 can be programmed with the voice patterns of various individuals of interest, and the module 4B can be programmed to attempt to match detected voice patterns against the various voice patterns stored in the camera 4.

At step 208, the tracking module 4C may use computer vision techniques such as object tracking and identification, for example, to determine location information (e.g., the angular position ($\alpha$) of a subject of interest with respect to a zero point of origin as shown in FIG. 1) for the content of interest. This step 208 may include, in certain embodiments, computing the polar coordinates of the position of the content of interest by using coordinate formulae (e.g., x=A cos($\alpha$); y=A sin($\alpha$)—where A is an approximation of the subject of interest's distance from the zero point). In the example shown in FIG. 1, a subject of interest $S_i$ moves from a first analysis portion (quadrant 152B) to another analysis portion (quadrant 152D). The tracking module 4C may be programmed to track such movements of content of interest and provide updated location information for such content.

In certain embodiments, global positioning system data may be used, at least in part, to determine location information for the content or subject of interest. In one example, the tracking module 4C may employ pattern recognition techniques to determine whether the content of interest includes a pattern resembling a human face (or portions thereof) and/or whether the identified human face matches a prestored pattern for the detected human face.

At step 210, the calculated location information may be embedded in metadata associated with each video frame, for example, or otherwise associated with the relevant portion of the video content being analyzed. In certain embodiments, the location information can be used by a video panning module 4D, either during playback of stored video content or during live video streaming, to automatically pan the video field of view at step 212 to promote keeping the content of interest within the desired user field of view. At step 214, the process described above can be repeated for multiple predetermined portions or frames (e.g., every nth frame) of the video content to promote continuously tracking presence and movement of content of interest within the video content. In addition, the video panning module 4D can be programmed for dynamically adjusting the field of view of the video content in response to the tracked content of interest. It can be appreciated that the functionality of dynamically adjusting the field of view of the video content can be configured to be activated or deactivated as desired by a user, for example. For example, activation or deactivation of the video panning module 4D could be initiated through a command received from the access device 6 to activate or deactivate this functionality.

In certain embodiments, an analysis portion transition module 4E may be provided to execute an algorithm for tracking transitions or movement of content of interest from one analysis portion 152A-152D to another analysis portion 152A-152D (e.g., from a first quadrant to a second quadrant). In one example, when a subject of interest is in a given quadrant $Q_x$ (e.g., quadrant 152B) audio for the content of interest is detected by the directional microphone for the quadrant and also microphones for other quadrants. Next, a moving average $A_{x\_avg}$ of the audio amplitude associated with the content of interest can be calculated for quadrant $Q_x$. The calculated $A_{x\_avg}$ can be compared against a preset handover threshold $HO_{x\_th}$ for $Q_x$. If $A_{x\_avg}$ exceeds $HO_{x\_th}$, then a determination can be made that the content of interest is located in quadrant $Q_x$. Otherwise $A_{x\_avg}$ can be compared against handover thresholds associated with the adjacent quadrants. If $A_{x\_avg}$ exceeds the handover threshold of one of the adjacent quadrants, then it can be deemed that the content of interest has moved to a different quadrant (e.g., quadrant 152D). The polar (x, y) coordinates of the content of interest's position in the new quadrant can then be calculated.

In certain embodiments, the camera 4 may be part of a security system configured to monitor a facility or area for criminal activity. Identified content of interest can be communicated to security personnel in the event that a crime has been committed, for example, or is currently in progress. In addition, identification of the content of interest may trigger an alarm or alert which is communicated to security personnel.

In certain embodiments, the video panning module 4D may be programmed to direct the field of view for the video in alignment with a predetermined direction, orientation, and position of the camera 4. For example, if a user is traveling on a vehicle or bicycle in a certain direction (e.g., north, east, south, west, etc.), then the video panning module 4D may match the field of view of the live stream or video playback to align with the travel direction of the user. So, if the user is traveling north on a mountain road, then the video field of view may be automatically panned to show the view traveling north along the mountain road.

Figure 3:
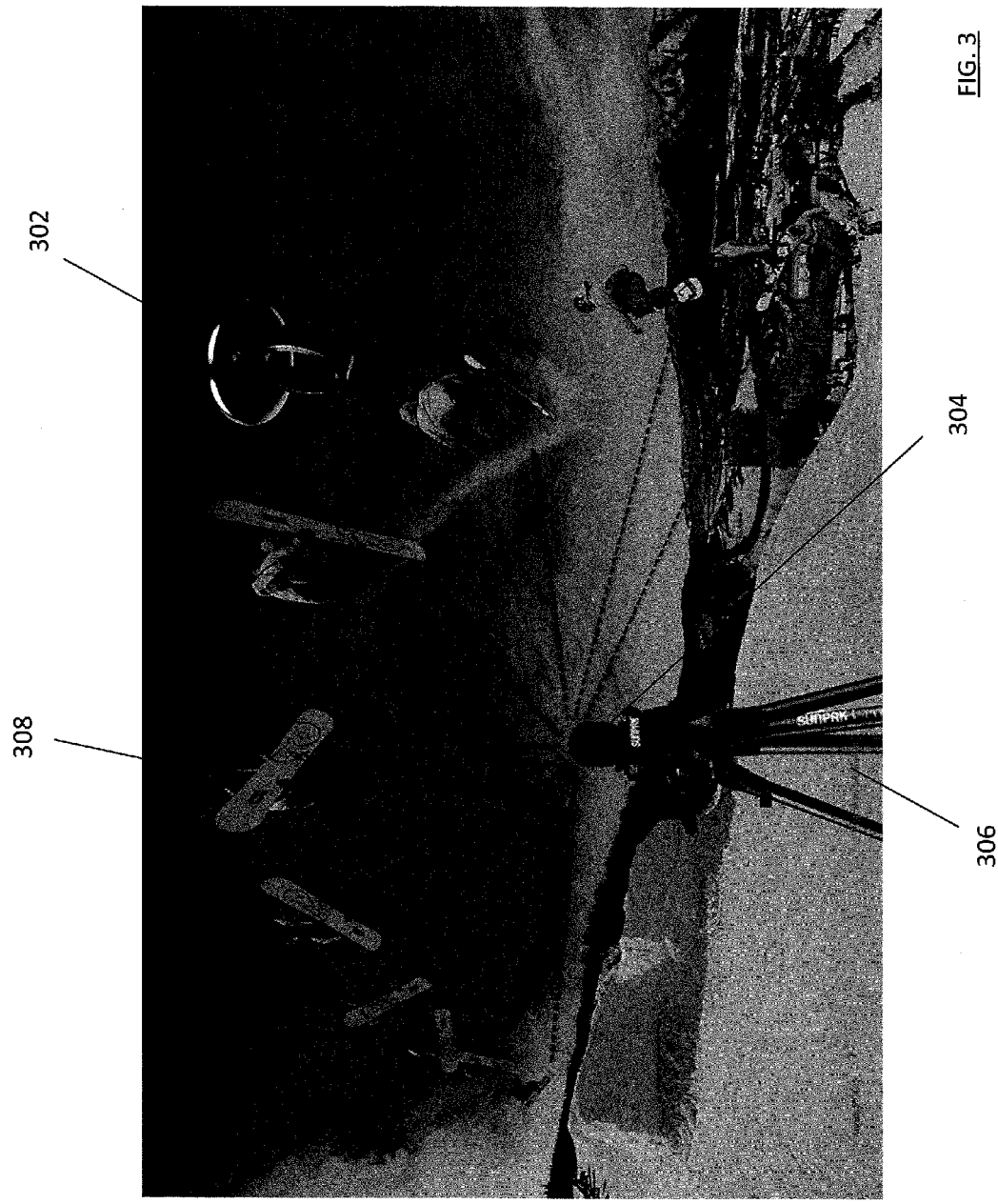
FIG. 3 schematically illustrates an example of using a remote tracking device for automatically adjusting a field of view for captured panoramic video content.

With reference to FIG. 3, in certain embodiments a camera 304 may be programmed to follow the movements of a remote tracking device 302 associated with a user, a vehicle, or other objects. In one embodiment, the tracking device 302 can be configured with wireless communication capability (e.g., Bluetooth) to communicate with a panoramic camera 304 (mounted on a tripod 306 in the example shown in FIG. 3). The camera 304 can be programmed to receive location information from the tracking device 302 and to adjust the field of view of the camera 304 (e.g., the zero point) to keep the tracking device 302 (and accordingly the object or user associated with the tracking device 302) at or near the center of the field of view of the camera 304. In the example shown, a skier 308 passes by the camera 304 mounted on the tripod 306, and the skier is wearing the tracking device 302 embodied as a ring. As the camera 304 receives location information from the tracking device 302, the field of view of the camera 304 is automatically panned to follow the movement of the skier 308 through space, as shown. The remote tracking device 302 may be a ring, for example, or another kind of user wearable or user carried device. In certain embodiments, the tracking device 302 may be any device capable of being connected or associated with an object of interest whose movement is to be tracked.

Figure 4:
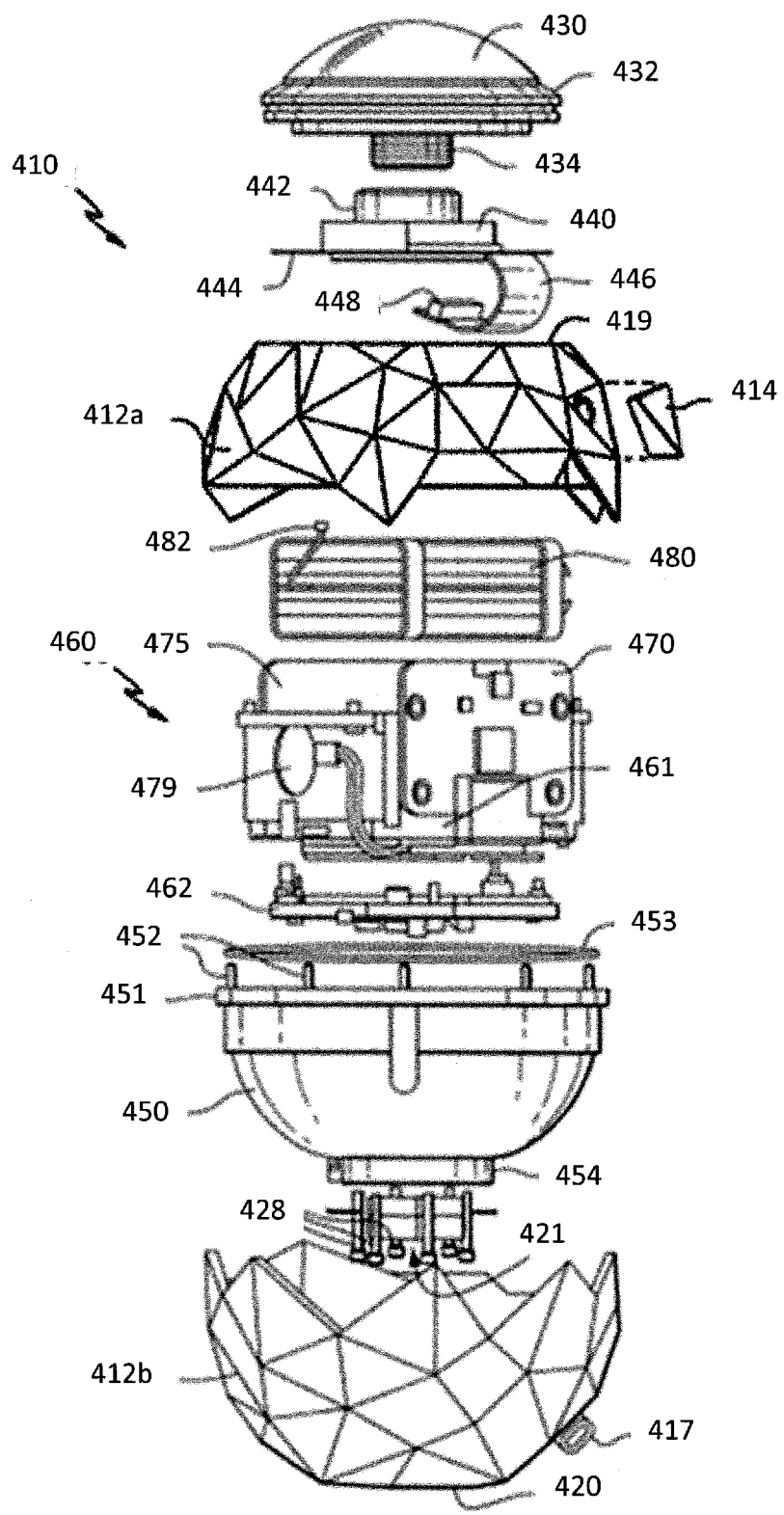
FIG. 4 includes an exploded view of an example of a panoramic camera which can be employed in connection with various embodiments of the invention described herein.

FIG. 4 is a side view of one example of a panoramic camera system 410 which can be used in accordance with various embodiments of the invention. The panoramic lens 430 and lens support ring 432 are connected to a hollow mounting tube 434 that is externally threaded. A video sensor 440 is located below the panoramic lens 430, and is connected thereto by means of a mounting ring 442 having internal threads engageable with the external threads of the mounting tube 434. The sensor 440 is mounted on a sensor board 444. A sensor ribbon cable 446 is connected to the sensor board 444 and has a sensor ribbon cable connector 448 at the end thereof.

The sensor 440 may comprise any suitable type of conventional sensor, such as CMOS or CCD imagers, or the like. For example, the sensor 440 may be a high resolution sensor sold under the designation IMX117 by Sony Corporation. In certain embodiments, video data from certain regions of the sensor 440 may be eliminated prior to transmission, e.g., the corners of a sensor having a square surface area may be eliminated because they do not include useful image data from the circular image produced by the panoramic lens assembly 430, and/or image data from a side portion of a rectangular sensor may be eliminated in a region where the circular panoramic image is not present. In certain embodiments, the sensor 440 may include an on-board or separate encoder. For example, the raw sensor data may be compressed prior to transmission, e.g., using conventional encoders such as jpeg, H.264, H.265, and the like. In certain embodiments, the sensor 440 may support three stream outputs such as: recording H.264 encoded .mp4 (e.g., image size 1504×1504); RTSP stream (e.g., image size 750×750); and snapshot (e.g., image size 1504×1504). However, any other desired number of image streams, and any other desired image size for each image stream, may be used.

A tiling and de-tiling process may be used in accordance with the present invention. Tiling is a process of chopping up a circular image of the sensor 440 produced from the panoramic lens 430 into pre-defined chunks to optimize the image for encoding and decoding for display without loss of image quality, e.g., as a 1080p image on certain mobile platforms and common displays. The tiling process may provide a robust, repeatable method to make panoramic video universally compatible with display technology while maintaining high video image quality. Tiling may be used on any or all of the image streams, such as the three stream outputs described above. The tiling may be done after the raw video is presented, then the file may be encoded with an industry standard H.264 encoding or the like. The encoded streams can then be decoded by an industry standard decoder and the user side. The image may be decoded and then de-tiled before presentation to the user. The de-tiling can be optimized during the presentation process depending on the display that is being used as the output display. The tiling and de-tiling process may preserve high quality panoramic images and optimize resolution, while minimizing processing required on both the camera side and on the user side for lowest possible battery consumption and low latency. The image may be dewarped through the use of dewarping software or firmware after the de-tiling reassembles the image. The dewarped image may be manipulated by an app, as more fully described below.

As further shown in FIG. 4, the camera system 410 includes a processor module 460 comprising a support cage 461. A processor board 462 is attached to the support cage 461. In addition, communication board(s) such as a WIFI board 470 and Bluetooth board 475 may be attached to the processor support cage 461. Although separate processor, WIFI and Bluetooth boards 462, 470 and 475 are shown in FIG. 4, it is understood that the functions of such boards may be combined onto a single board. Furthermore, additional functions may be added to such boards such as cellular communication and motion sensor functions, which are more fully described below. A vibration motor 479 may also be attached to the support cage 461.

The processor board 462 may function as the command and control center of the camera system 410 to control the video processing, data storage and wireless or other communication command and control. Video processing may comprise encoding video using industry standard H.264 profiles or the like to provide natural image flow with a standard file format. Decoding video for editing purposes may also be performed. Data storage may be accomplished by writing data files to an SD memory card or the like, and maintaining a library system. Data files may be read from the SD card for preview and transmission. Wireless command and control may be provided. For example, Bluetooth commands may include processing and directing actions of the camera received from a Bluetooth radio and sending responses to the Bluetooth radio for transmission to the camera. WIFI radio may also be used for transmitting and receiving data and video. Such Bluetooth and WIFI functions may be performed with the separate boards 475 and 470 illustrated in FIG. 4, or with a single board. Cellular communication may also be provided, e.g., with a separate board, or in combination with any of the boards described above.

A battery 480 with a battery connector 482 is provided. Any suitable type of battery or batteries may be used, such as conventional rechargeable lithium ion batteries and the like.

The camera system 410 may include one or more motion sensors, e.g., as part of the processor module 460. As used herein, the term "motion sensor" includes sensors that can detect motion, orientation, position and/or location, including linear motion and/or acceleration, rotational motion and/or acceleration, orientation of the camera system (e.g., pitch, yaw, tilt), geographic position, gravity vector, altitude, height, and the like. For example, the motion sensor(s) may include accelerometers, gyroscopes, global positioning system (GPS) sensors, barometers and/or compasses that produce data simultaneously with the optical and, optionally, audio data. Such motion sensors can be used to provide the motion, orientation, position and location information used to perform some of the image processing and display functions described herein. This data may be encoded and recorded. The captured motion sensor data may be synchronized with the panoramic visual images captured by the camera system 410, and may be associated with a particular image view corresponding to a portion of the panoramic visual images, for example, as described in U.S. Pat. Nos. 8,730,322, 8,836,783 and 9,204,042.

Orientation based tilt can be derived from accelerometer data. This can be accomplished by computing the live gravity vector relative to the camera system 410. The angle of the gravity vector in relation to the device along the device's display plane will match the tilt angle of the device. This tilt data can be mapped against tilt data in the recorded media. In cases where recorded tilt data is not available, an arbitrary horizon value can be mapped onto the recorded media. The tilt of the device may be used to either directly specify the tilt angle for rendering (i.e. holding the device vertically may center the view on the horizon), or it may be used with an arbitrary offset for the convenience of the operator. This offset may be determined based on the initial orientation of the device when playback begins (e.g., the angular position of the device when playback is started can be centered on the horizon).

Any suitable accelerometer may be used, such as conventional 3-axis and 9-axis accelerometers. For example, a 3-axis BMA250 accelerometer from BOSCH or the like may be used. A 3-axis accelerometer may enhance the capability of the camera to determine its orientation in 3D space using an appropriate algorithm. The camera system 410 may capture and embed the raw accelerometer data into the metadata path in a MPEG4 transport stream, providing the full capability of the information from the accelerometer that provides the user side with details to orient the image to the horizon.

The motion sensor may comprise a GPS sensor capable of receiving satellite transmissions, e.g., the system can retrieve position information from GPS data. Absolute yaw orientation can be retrieved from compass data, acceleration due to gravity may be determined through a 3-axis accelerometer when the computing device is at rest, and changes in pitch, roll and yaw can be determined from gyroscope data. Velocity can be determined from GPS coordinates and timestamps from the software platform's clock. Finer precision values can be achieved by incorporating the results of integrating acceleration data over time. The motion sensor data can be further combined using a fusion method that blends only the required elements of the motion sensor data into a single metadata stream or in future multiple metadata streams.

The motion sensor may comprise a gyroscope which measures changes in rotation along multiple axes over time, and can be integrated over time intervals, e.g., between the previous rendered frame and the current frame. For example, the total change in orientation can be added to the orientation used to render the previous frame to determine the new orientation used to render the current frame. In cases where both gyroscope and accelerometer data are available, gyroscope data can be synchronized to the gravity vector periodically or as a one-time initial offset. Automatic roll correction can be computed as the angle between the device's vertical display axis and the gravity vector from the device's accelerometer.

Any suitable type of microphone may be provided inside the camera body 412 near the microphone hole 416 to detect sound. One or more microphones may be used inside and/or outside the camera body 412. In addition to an internal microphone(s), at least one microphone may be mounted on the camera system 410 and/or positioned remotely from the system. In the event that multiple channels of audio data are recorded from a plurality of microphones in a known orientation, the audio field may be rotated during playback to synchronize spatially with the interactive renderer display. The microphone output may be stored in an audio buffer and compressed before being recorded. In the event that multiple channels of audio data are recorded from a plurality of microphones in a known orientation, the audio field may be rotated during playback to synchronize spatially with the corresponding portion of the video image.

In accordance with embodiments of the present invention, the panoramic lens may comprise transmissive hyper-fisheye lenses with multiple transmissive elements (e.g., dioptric systems); reflective mirror systems (e.g., panoramic mirrors as disclosed in U.S. Pat. Nos. 6,856,472; 7,058,239; and 7,123,777, which are incorporated herein by reference); or catadioptric systems comprising combinations of transmissive lens(es) and mirror(s). In certain embodiments, the panoramic lens 430 comprises various types of transmissive dioptric hyper-fisheye lenses. Such lenses may have fields of view FOVs as described above, and may be designed with suitable F-stop speeds. F-stop speeds may typically range from f/1 to f/8, for example, from f/1.2 to f/3. As a particular example, the F-stop speed may be about f/2.5.

The images from the camera system 410 may be displayed in any suitable manner. For example, a touch screen may be provided to sense touch actions provided by a user. User touch actions and sensor data may be used to select a particular viewing direction, which is then rendered. The device can interactively render the texture mapped video data in combination with the user touch actions and/or the sensor data to produce video for display. The signal processing can be performed by a processor or processing circuitry.

Video images from the camera system 410 may be downloaded to various display devices, such as a smart phone using an app, or any other current or future display device. Many current mobile computing devices, such as the iPhone, contain built-in touch screen or touch screen input sensors that can be used to receive user commands. In usage scenarios where a software platform does not contain a built-in touch or touch screen sensor, externally connected input devices can be used. User input such as touching, dragging, and pinching can be detected as touch actions by touch and touch screen sensors though the usage of off the shelf software frameworks.

User input, in the form of touch actions, can be provided to the software application by hardware abstraction frameworks on the software platform. These touch actions enable the software application to provide the user with an interactive presentation of prerecorded media, shared media downloaded or streamed from the internet, or media which is currently being recorded or previewed.

An interactive renderer may combine user input (touch actions), still or motion image data from the camera (via a texture map), and movement data (encoded from geospatial/orientation data) to provide a user controlled view of prerecorded media, shared media downloaded or streamed over a network, or media currently being recorded or previewed. User input can be used in real time to determine the view orientation and zoom. As used in this description, real time means that the display shows images at essentially the same time the images are being sensed by the device (or at a delay that is not obvious to a user) and/or the display shows images changes in response to user input at essentially the same time as the user input is received. By combining the panoramic camera with a mobile computing device, the internal signal processing bandwidth can be sufficient to achieve the real time display.

The user can select from live view from the camera, videos stored on the device, view content on the user (full resolution for locally stored video or reduced resolution video for web streaming), and interpret/re-interpret sensor data. Proxy streams may be used to preview a video from the camera system on the user side and are transferred at a reduced image quality to the user to enable the recording of edit points. The edit points may then be transferred and applied to the higher resolution video stored on the camera. The high-resolution edit is then available for transmission, which increases efficiency and may be an optimum method for manipulating the video files.

The camera system of the present invention may be used with various apps. For example, an app can search for any nearby camera system and prompt the user with any devices it locates. Once a camera system has been discovered, a name may be created for that camera. If desired, a password may be entered for the camera WIFI network also. The password may be used to connect a mobile device directly to the camera via WIFI when no WIFI network is available. The app may then prompt for a WIFI password. If the mobile device is connected to a WIFI network, that password may be entered to connect both devices to the same network.

The app may enable navigation to a "cameras" section, where the camera to be connected to WIFI in the list of devices may be tapped on to have the app discover it. The camera may be discovered once the app displays a Bluetooth icon for that device. Other icons for that device may also appear, e.g., LED status, battery level and an icon that controls the settings for the device. With the camera discovered, the name of the camera can be tapped to display the network settings for that camera. Once the network settings page for the camera is open, the name of the wireless network in the SSID field may be verified to be the network that the mobile device is connected on. An option under "security" may be set to match the network's settings and the network password may be entered. Note some WIFI networks will not require these steps. The "cameras" icon may be tapped to return to the list of available cameras. When a camera has connected to the WIFI network, a thumbnail preview for the camera may appear along with options for using a live viewfinder or viewing content stored on the camera.

In situations where no external WIFI network is available, the app may be used to navigate to the "cameras" section, where the camera to connect to may be provided in a list of devices. The camera's name may be tapped on to have the app discover it. The camera may be discovered once the app displays a Bluetooth icon for that device. Other icons for that device may also appear, e.g., LED status, battery level and an icon that controls the settings for the device. An icon may be tapped on to verify that WIFI is enabled on the camera. WIFI settings for the mobile device may be addressed in order to locate the camera in the list of available networks. That network may then be connected to. The user may then switch back to the app and tap "cameras" to return to the list of available cameras. When the camera and the app have connected, a thumbnail preview for the camera may appear along with options for using a live viewfinder or viewing content stored on the camera.

In certain embodiments, video can be captured without a mobile device. To start capturing video, the camera system may be turned on by pushing the power button. Video capture can be stopped by pressing the power button again.

In other embodiments, video may be captured with the use of a mobile device paired with the camera. The camera may be powered on, paired with the mobile device and ready to record. The "cameras" button may be tapped, followed by tapping "viewfinder." This will bring up a live view from the camera. A record button on the screen may be tapped to start recording. To stop video capture, the record button on the screen may be tapped to stop recording.

To playback and interact with a chosen video, a play icon may be tapped. The user may drag a finger around on the screen to change the viewing angle of the shot. The video may continue to playback while the perspective of the video changes. Tapping or scrubbing on the video timeline may be used to skip around throughout the video.

Firmware may be used to support real-time video and audio output, e.g., via USB, allowing the camera to act as a live web-cam when connected to a PC. Recorded content may be stored using standard DCIM folder configurations. A YouTube mode may be provided using a dedicated firmware setting that allows for "YouTube Ready" video capture including metadata overlay for direct upload to YouTube. Accelerometer activated recording may be used. A camera setting may allow for automatic launch of recording sessions when the camera senses motion and/or sound. A built-in accelerometer, altimeter, barometer and GPS sensors may provide the camera with the ability to produce companion data files in .csv format. Time-lapse, photo and burst modes may be provided. The camera may also support connectivity to remote Bluetooth microphones for enhanced audio recording capabilities.

The panoramic camera system 410 of the present invention has many uses. The camera may be mounted on any support structure, such as a person or object (either stationary or mobile). For example, the camera may be worn by a user to record the user's activities in a panoramic format, e.g., sporting activities and the like. Examples of some other possible applications and uses of the system in accordance with embodiments of the present invention include: motion tracking; social networking; 360° mapping and touring; security and surveillance; and military applications.

For motion tracking, the processing software can be written to detect and track the motion of subjects of interest (people, vehicles, etc.) and display views following these subjects of interest.

For social networking and entertainment or sporting events, the processing software may provide multiple viewing perspectives of a single live event from multiple devices. Using geo-positioning data, software can display media from other devices within close proximity at either the current or a previous time. Individual devices can be used for n-way sharing of personal media (much like YouTube or flickr). Some examples of events include concerts and sporting events where users of multiple devices can upload their respective video data (for example, images taken from the user's location in a venue), and the various users can select desired viewing positions for viewing images in the video data. Software can also be provided for using the apparatus for teleconferencing in a one-way (presentation style—one or two-way audio communication and one-way video transmission), two-way (conference room to conference room), or n-way configuration (multiple conference rooms or conferencing environments).

For 360° mapping and touring, the processing software can be written to perform 360° mapping of streets, buildings, and scenes using geospatial data and multiple perspectives supplied over time by one or more devices and users. The apparatus can be mounted on ground or air vehicles as well, or used in conjunction with autonomous/semi-autonomous drones. Resulting video media can be replayed as captured to provide virtual tours along street routes, building interiors, or flying tours. Resulting video media can also be replayed as individual frames, based on user requested locations, to provide arbitrary 360° tours (frame merging and interpolation techniques can be applied to ease the transition between frames in different videos, or to remove temporary fixtures, vehicles, and persons from the displayed frames).

For security and surveillance, the apparatus can be mounted in portable and stationary installations, serving as low profile security cameras, traffic cameras, or police vehicle cameras. One or more devices can also be used at crime scenes to gather forensic evidence in 360° fields of view. The optic can be paired with a ruggedized recording device to serve as part of a video black box in a variety of vehicles; mounted either internally, externally, or both to simultaneously provide video data for some predetermined length of time leading up to an incident.

For military applications, man-portable and vehicle mounted systems can be used for muzzle flash detection, to rapidly determine the location of hostile forces. Multiple devices can be used within a single area of operation to provide multiple perspectives of multiple targets or locations of interest. When mounted as a man-portable system, the apparatus can be used to provide its user with better situational awareness of his or her immediate surroundings. When mounted as a fixed installation, the apparatus can be used for remote surveillance, with the majority of the apparatus concealed or camouflaged. The apparatus can be constructed to accommodate cameras in non-visible light spectrums, such as infrared for 360° heat detection.

Figure 5:
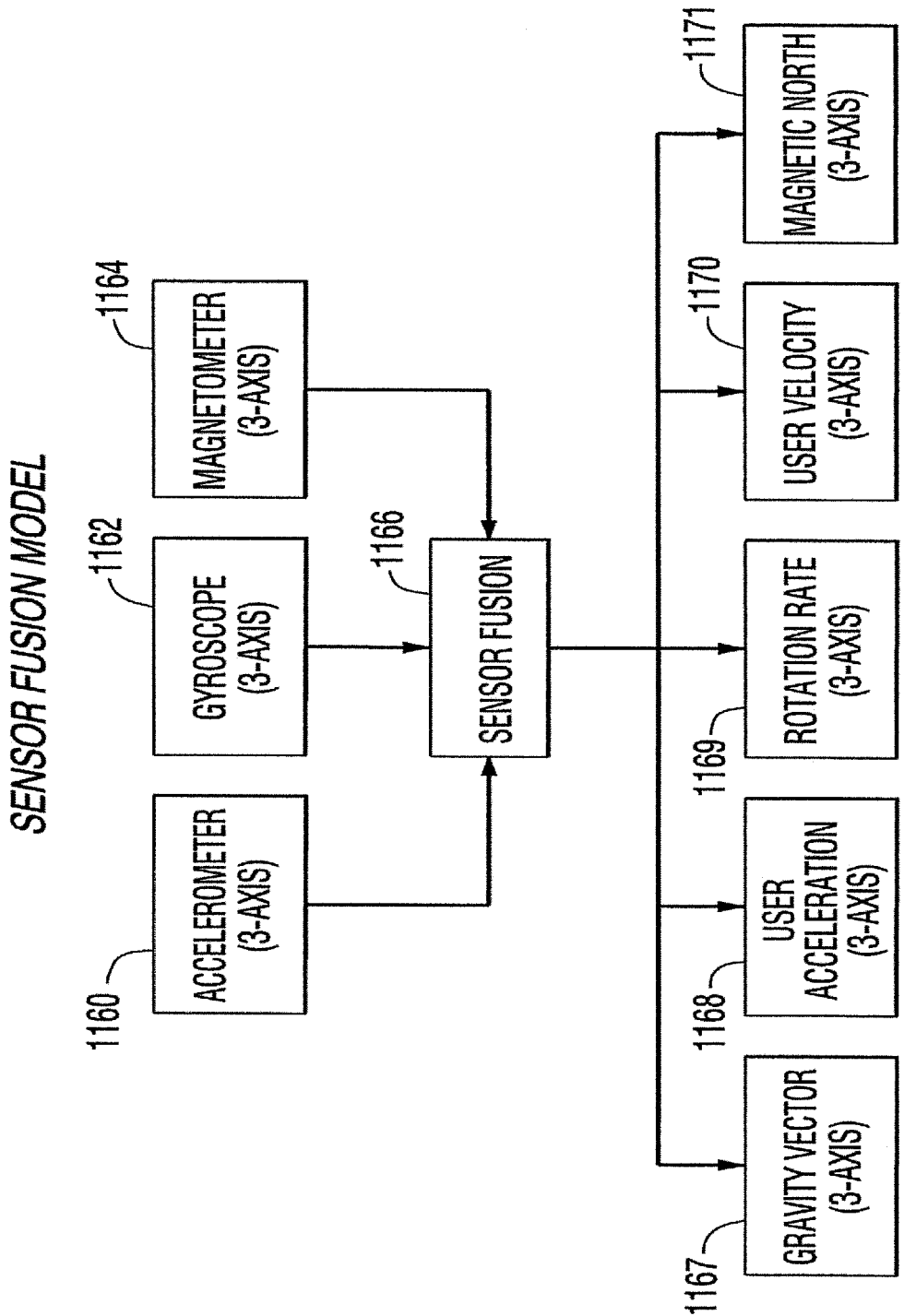
FIG. 5 depicts an example of a sensor fusion model which can be employed in connection with various embodiments of the devices and processes described herein.

FIG. 5 depicts an example of a sensor fusion model which can be employed in connection with various embodiments of the devices and processes described herein. As shown, a sensor fusion process 1166 receives input data from one or more of an accelerometer 1160, a gyroscope 1162, or a magnetometer 1164, each of which may be a three-axis sensor device, for example. Those skilled in the art can appreciate that multi-axis accelerometers 1160 can be configured to detect magnitude and direction of acceleration as a vector quantity, and can be used to sense orientation (e.g., due to direction of weight changes). The gyroscope 1162 can be used for measuring or maintaining orientation, for example. The magnetometer 1164 may be used to measure the vector components or magnitude of a magnetic field, wherein the vector components of the field may be expressed in terms of declination (e.g., the angle between the horizontal component of the field vector and magnetic north) and the inclination (e.g., the angle between the field vector and the horizontal surface). With the collaboration or fusion of these various sensors 1160, 1162, 1164, one or more of the following data elements can be determined during operation of the camera device: gravity vector 1167, user acceleration 1168, rotation rate 1169, user velocity 1170, and/or magnetic north 1171.

Figure 6:
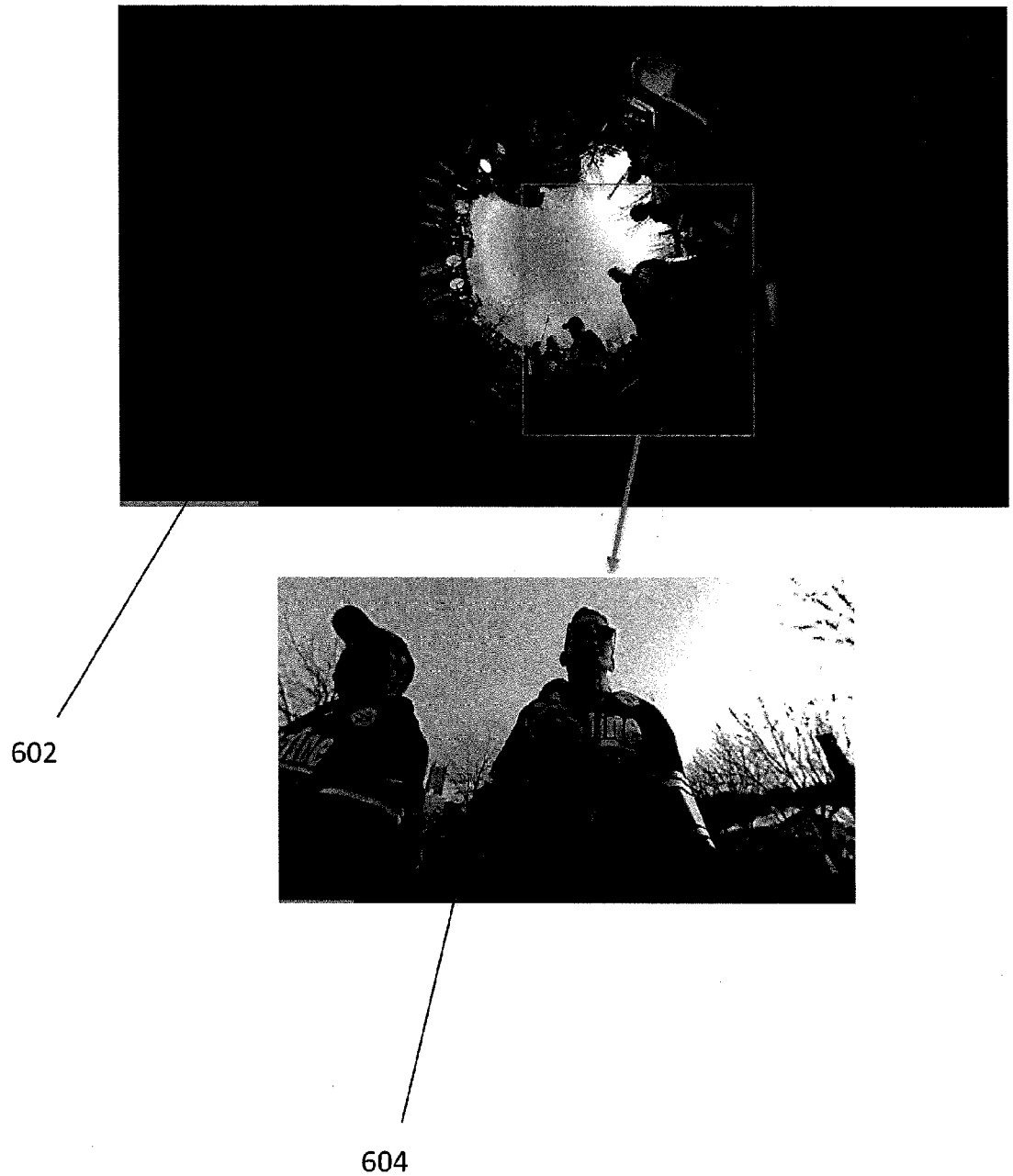
FIG. 6 includes screen captures illustrating examples of identifying content of interest through audio detection; and, FIGS. 7A-7D include screen captures illustrating examples of portions of captured video content not identified as content of interest.
Figure 7A:
Figure 7B:
Figure 7C:
Figure 7D:

FIG. 6 illustrates an example of the application and processing of certain modules described herein. Captured video content 602 is analyzed by the audio detection module 4B, for example, and a drum noise is identified in the video content 602. Content of interest 604 is identified in association with the detected drum noise, and a human drummer is accordingly included in the content of interest 604. FIGS. 7A-7D illustrate several examples of portions of the captured video content that were not identified as containing content of interest, in contrast to the content of interest 604 shown in FIG. 6.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, device configurations, or process flows described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that a sufficient understanding of the present invention can be gained by the present disclosure, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as a computer system (non-volatile) memory. Furthermore, some of the processes may be programmed when the computer system is manufactured or via a computer-readable memory storage medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary. Memory and/or storage components may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

A "computer," "computer system," "computing apparatus," "component," or "computer processor" may be, for example and without limitation, a processor, microcomputer, minicomputer, server, mainframe, laptop, personal data assistant (PDA), wireless e-mail device, smart phone, mobile phone, electronic tablet, cellular phone, pager, fax machine, scanner, or any other programmable device or computer apparatus configured to transmit, process, and/or receive data. Computer systems and computer-based devices disclosed herein may include memory and/or storage components for storing certain software applications used in obtaining, processing, and communicating information. It can be appreciated that such memory may be internal or external with respect to operation of the disclosed embodiments. In various embodiments, a "host," "engine," "loader," "filter," "platform," or "component" may include various computers or computer systems, or may include a reasonable combination of software, firmware, and/or hardware. In certain embodiments, a "module" may include software, firmware, hardware, or any reasonable combination thereof.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

Although some embodiments may be illustrated and described as comprising functional components, software, engines, and/or modules performing various operations, it can be appreciated that such components or modules may be implemented by one or more hardware components, software components, and/or combination thereof. The functional components, software, engines, and/or modules may be implemented, for example, by logic (e.g., instructions, data, and/or code) to be executed by a logic device (e.g., processor). Such logic may be stored internally or externally to a logic device on one or more types of computer-readable storage media. In other embodiments, the functional components such as software, engines, and/or modules may be implemented by hardware elements that may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software, engines, and/or modules may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some cases, various embodiments may be implemented as an article of manufacture. The article of manufacture may include a computer readable storage medium arranged to store logic, instructions and/or data for performing various operations of one or more embodiments. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Certain embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary aspects and aspects shown and described herein.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein.

The flow charts and methods described herein show the functionality and operation of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flow charts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as claimed herein.

What is claimed is:

1. A method for digitally processing audio and panoramic video content captured by a single panoramic video camera, the method comprising:
    dividing the captured panoramic video content into multiple analysis portions;
    determining whether at least one of the analysis portions has audio associated therewith;
    when an analysis portion has audio associated therewith, analyzing the analysis portion to identify content of interest within the analysis portion; and
    during display of the captured panoramic video content, automatically panning within the captured panoramic video content until the identified content of interest is displayed.

2. The method of claim 1, wherein dividing the captured panoramic video content into multiple analysis portions comprises:
    dividing the captured panoramic video content into quadrants, wherein each quadrant of the captured panoramic video content is a respective analysis portion.

3. The method of claim 1, wherein the captured panoramic video content is divided into multiple analysis portions on a video frame by video frame basis.

* * * * *